United States Patent Office 3,085,740
Patented Apr. 16, 1963

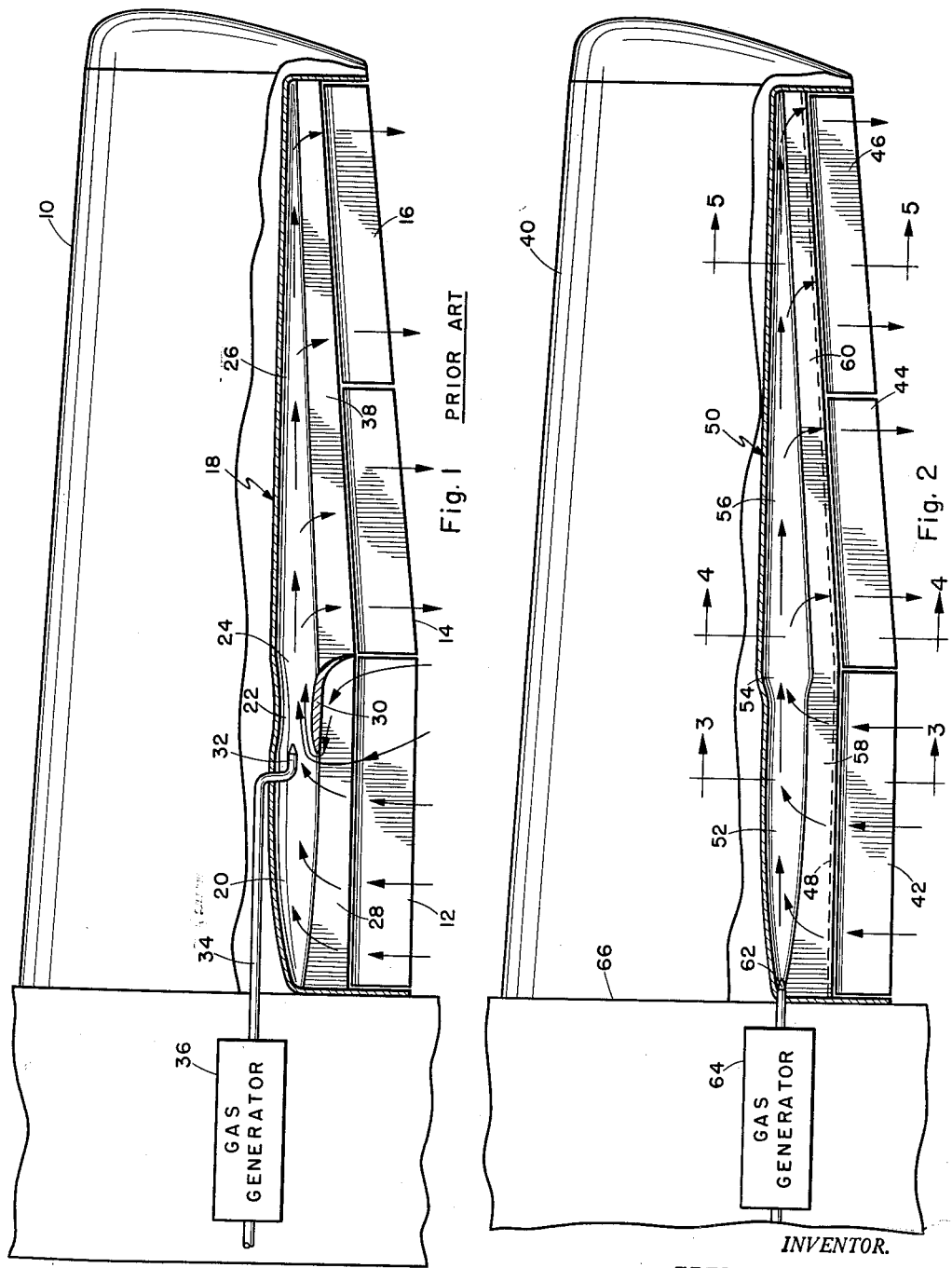

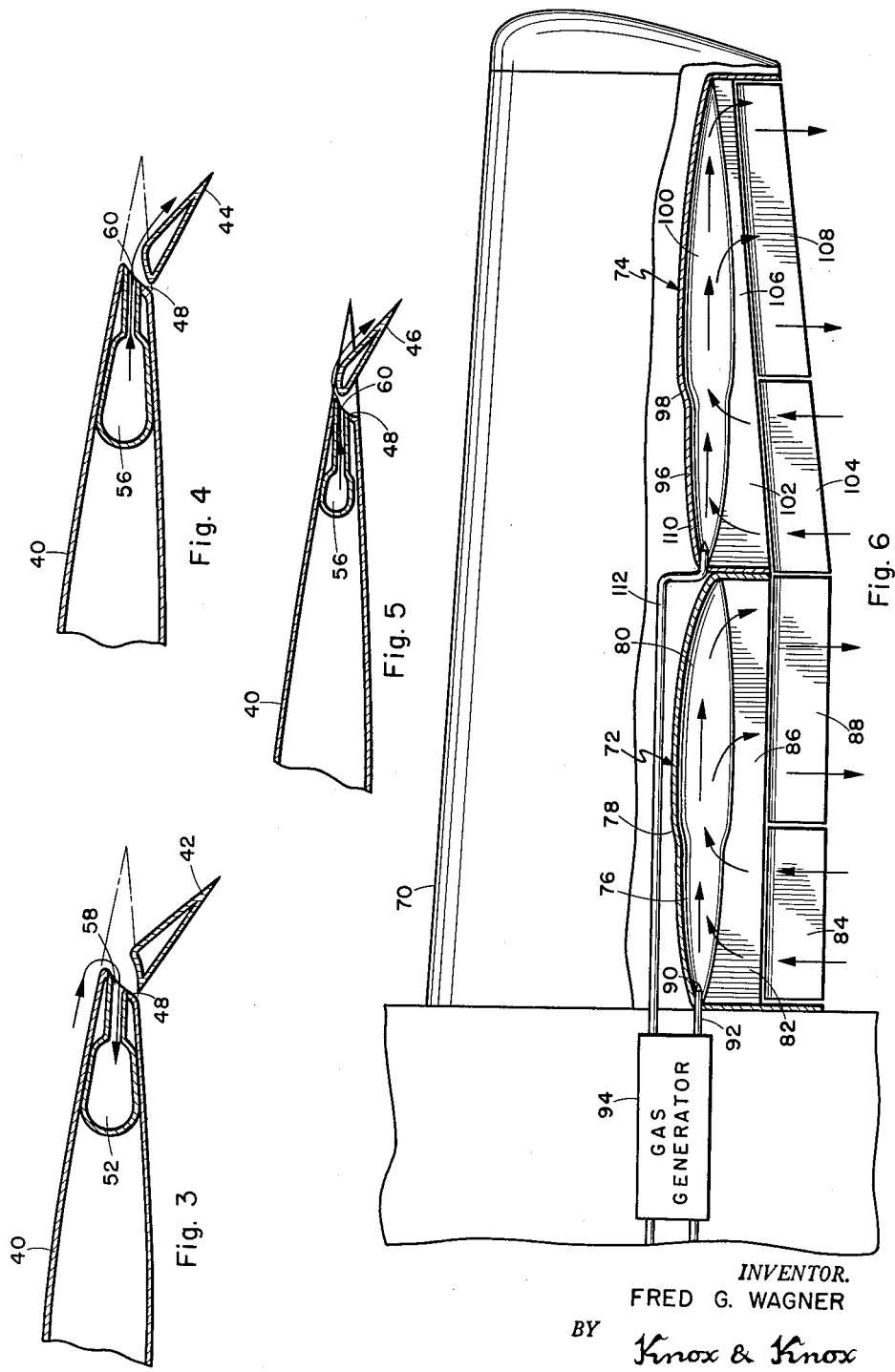

3,085,740
END INLET JET PUMP FOR BOUNDARY LAYER CONTROL SYSTEM
Fred G. Wagner, San Diego, Calif., assignor to The Ryan Aeronautical Co., San Diego, Calif.
Filed Aug. 30, 1960, Ser. No. 52,916
4 Claims. (Cl. 230—95)

The present invention relates generally to jet pumps and more particularly to an end inlet jet pump for a boundary layer control system.

In aircraft utilizing boundary layer control means to increase lift and control at low speeds, some means is necessary to produce a primary airflow which can itself be used as boundary layer flow, or may be used to induce secondary flow of ambient air for increased effect. Blowers are efficient for primary flow but are bulky, cause obstructions in the flow and are subject to mechanical deficiencies. In present practice, the jet pump principle has proved to be most practical, a primary flow of air or gas from a suitable source being ejected from a nozzle assembly and used to entrain ambient air, the total gas flow then being exhausted over the appropriate control surface or surfaces. In the usual configuration air is drawn in through an intake or suction duct by a jet pump which is directed into a mixing tube leading to an outlet or blowing duct, the mixing tube being disposed between inlet and outlet ducts. For maximum efficiency the mixing tube must be as long as possible, but to incorporate this into an aircraft wing and utilize maximum inlet and outlet areas, severe flow reversal is necessary in part of the inlet area and greatly reduces efficiency. The ideal jet pump installation requires a smooth, continuous flow, maximum mixing of primary and secondary flows and correct distribution of exhausted gases.

The primary object of this invention, therefore, is to provide jet pump means in which the primary flow is introduced at one end of the inlet duct and utilizes the entire inlet duct as a mixing tube, which leads through a short diffuser section into the outlet duct, the flow being substantially straight through and uninterrupted.

Another object of this invention is to provide jet pump means in which the entire duct system can be distributed spanwise along a wing adjacent the trailing edge and is sufficiently compact to fit into a thin, high speed wing.

Another object of this invention is to provide jet pump means having ducting which is arranged to distribute a boundary layer control flow of gases evenly over the control surfaces, without the need for elaborate flow guiding structures.

A further object of this invention is to provide jet pump means in which the source of primary gas flow may be separated from the duct structure and installed in any convenient part of the aircraft as a self-contained, easily serviced unit.

Finally, it is an object to provide jet pump means of the aforementioned character which is simple and convenient to install and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a top plan view of an aircraft wing, partially cut away, illustrating the prior art jet pump and duct arrangement;

FIGURE 2 is a top plan view of an aircraft wing with the improved jet pump arrangement according to the present disclosure;

FIGURE 3 is an enlarged fragmentary sectional view taken on the line 3—3 of FIGURE 2;
FIGURE 4 is an enlarged fragmentary sectional view taken on the line 4—4 of FIGURE 2;
FIGURE 5 is an enlarged fragmentary sectional view taken on the line 5—5 of FIGURE 2; and
FIGURE 6 is a top plan view of a wing showing a multiple duct installation.

Similar characters of reference indicate similar or identical elements and portions throughout the specification and throughout the views of the drawing.

Referring now to FIGURE 1 of the drawings, the wing 10 is provided with an inboard suction flap 12, an intermediate blown flap 14 and an outboard aileron 16, mounted in a conventional manner. Inside the wing 10 forwardly of the control surfaces is a duct assembly 18 having an inlet portion 20, a mixing tube 22, a diffuser 24 and an outlet portion 26, in that order, from root to tip of the wing. Air is drawn into the inlet portion 20 through an inlet or suction slot 28 extending spanwise forwardly of the suction flap 12, a portion of said inlet slot being obstructed by a curved baffle 30 which encloses the mixing tube 22 and deflects incoming air to the inlet end of said mixing tube. The jet pump nozzle 32 is mounted in the inlet end of mixing tube 22 and is directed outboard, primary gas being supplied through a delivery tube 34 from a gas generator 36 of suitable type. From the directional arrows in FIGURE 1, it will be evident that severe flow reversal of a portion of the incoming air is necessary if the full inlet slot 28 is to be used and, to fit the duct assembly into the wing, the mixing tube 22 is necessarily short, resulting in further loss of efficiency. The combined primary gas and secondary air-flow is ejected from an outlet slot 38 extending rearward from outlet portion 26 to carry the flow over the flap 14 and aileron 16. While this arrangement has been tested, the efficiency is reduced by the poor flow characteristics.

In the improved arrangement illustrated in FIGURES 2–5, the wing 40 is provided with an inboard suction flap 42, an intermediate blown flap 44 and an outboard blown aileron 46, the mounting and actuating means for such control surfaces being well known. Immediately forwardly of the control surfaces the wing structure is closed by a rear wall 48 and forwardly of said wall is a spanwise duct assembly 50 having an inboard mixing tube 52, a diffuser portion 54 adjacent the junction of flaps 42 and 44, and an outboard distributing portion 56, all forming a continuous, uninterrupted duct. In the rear wall 48 is an inlet or suction slot 58 communicating with the mixing tube 52 and an outlet or blowing slot 60 communicating with the distributing portion 56, said slots extending spanwise and being substantially continuous. While obstructions are undesirable in the slots it may be necessary for structural strength purposes, to insert small vanes at intervals, but these have been omitted for clarity.

At the inboard end of the mixing tube 52 is an outwardly directed jet pump nozzle 62 connected to a gas generator 64, which may be conveniently mounted in the aircraft fuselage, indicated at 66. The gas generator 64 may be of any suitable type, such as a compressed air tank, auxiliary compressor driven by any means, or, if the aircraft is turbojet powered, can be a tap from a high pressure point on the engine. Alternatively, if the wing and duct structure is suitable, fuel may be ejected from the nozzle 62 and burned in the mixing tube 52.

With the jet pump in operation, a high speed primary gas flow issues from the nozzle 62 in a spanwise direction, the entrainment action causing ambient air or secondary flow to be drawn in through the suction slot 58, substantially normal to the direction of primary flow, and mixed with the primary gases. The cross sectional area of the mixing tube 52 gradually increases in the direction of flow to accommodate the additional secondary air, it being desirable to design the mixing tube or intake portion of the duct so that the secondary air is drawn in substantially constantly along the length of the suction flap 42. The diffuser portion 54 enlarges slightly to allow expansion of the combined flow to correct static pressure in the distributing portion 56, the cross sectional area of which decreases in the direction of flow, so that the gases are forced rearwardly through the blowing slot 60 substantially constantly along the length of flap 44 and aileron 46. The proper variation in cross sectional area through the duct assembly will provide a constant static pressure, with no losses due to pressure changes. However, for certain special conditions, variations in static pressure may be necessary to control flow characteristics and the duct can be designed to suit.

The flow is thus initiated at the root end of the wing and moves outwardly toward the tip in a straight through, unobstructed path. With proper duct design, as described above, no internal baffles or guides are necessary to control the flow, with the result that turbulence is reduced to a minimum. The precise locations of the slots in the rear wall 48, as illustrated in FIGURES 3–5, will be dependent on the particular shapes of flaps and ailerons to obtain the proper flow of boundary layer control air over the surfaces. The suction slot 58, in particular, need not be located in the rear wall, but could be on the upper wing surface, or may be in the form of a porous area. The blowing slot 60, however, must eject the gas flow over the control surfaces correctly in order to prevent boundary layer separation and to increase the effectiveness of the surfaces.

For special control surface arrangements, or for high aspect ratio wings in which a single duct may be of impractical length, the duct may be divided, as in FIGURE 6. In this wing 70 there are two complete ducts, an inboard duct assembly 72 and an outboard duct assembly 74. The inboard duct assembly 72 has a mixing tube 76, a diffuser portion 78 and a distributing portion 80, said mixing tube having a suction slot 82 adjacent a suction flap 84 and said distributing portion having a blowing slot 86 to eject gases over a blown flap 88. At the inboard end of the mixing tube 76 is a jet pump nozzle 90 connected by a delivery tube 92 to a gas generator 94.

The outboard duct assembly 74 is similar and has a mixing tube 96, a diffuser portion 98 and a distributing portion 100, with a suction slot 102 adjacent a suction flap 104 and a blowing slot 106 discharging gases over a blown aileron 108. At the inboard end of mixing tube 96 is a further jet pump nozzle 110, connected by a delivery tube 112 to gas generator 94.

The operation is as previously described, each jet pump system entraining ambient air and exhausting the resultant combined gas flow over a control surface. While the divided duct system is not as compact as a single duct, the gas generator is still remote and each duct retains full flow efficiency, with an added advantage of individual control of each control surface if necessary.

The system is applicable to virtually any aerodynamic control surfaces such as elevators, rudder, compound flaps, and multi-purpose surfaces such as elevons. Or, with suitable design of the blowing or outlet slots, the gases may be utilized for direct reaction control, since the augmentation of flow by the jet pump action is considerable. The installation of the duct means is thus not limited to an aircraft wing, such an arrangement being illustrated merely as an example of practical use.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:
1. Jet pump means, comprising: an elongated duct having an inlet portion, and an outlet portion continuous therewith; a primary gas flow injecting jet pump nozzle at the end of said inlet portion remote from said outlet portion and directed toward the outlet portion; said inlet portion having an elongated inlet opening through which secondary gas flow is entrained substantially normal to the primary flow from said nozzle along the entire length of the inlet portion; and said outlet portion having an elongated outlet opening through which the combined gas flows are ejected.

2. Jet pump means, comprising: an elongated duct having an inlet portion, and an outlet portion continuous therewith; a primary gas flow injecting jet pump nozzle at the end of said inlet portion remote from said outlet portion and directed toward the outlet portion; said inlet portion having a longitudinally extending inlet opening through which secondary gas flow is entrained along the full length thereof substantially normal to the primary flow from said nozzle; said inlet portion constituting a mixing tube and having a gradually increasing cross sectional area in the direction of flow; said outlet portion having a gradually decreasing cross sectional area in the directional flow; and said outlet portion having a longitudinally extending outlet opening through which the combined flows are ejected along substantially the full length of the outlet portion.

3. Jet pump means, comprising: an elongated duct having a mixing tube at one end, an intermediate diffuser portion and a distributing portion at the other end thereof forming a substantially uninterrupted duct; a primary gas flow injecting jet pump nozzle at the end of said mixing tube remote from and directed toward said distributing portion; said mixing tube having an inlet opening extending longitudinally substantially the full length thereof through which secondary gas flow is entrained; said mixing tube having a gradually increasing cross sectional area in the direction of flow; said distributing portion decreasing gradually in cross sectional area in the direction of flow and having a longitudinally extending outlet opening through which the combined gas flows are ejected.

4. Jet pump means, comprising: an elongated duct having a mixing tube at one end, a short intermediate diffuser portion, and a distributing portion at the other end thereof, forming a substantially uninterrupted duct; a primary gas flow injecting pump nozzle at the end of said mixing tube, remote from said distributing portion and directed toward the distributing portion; said mixing tube having an inlet opening extending longitudinally the full length thereof; said distributing portion having an outlet extending longitudinally the full length thereof and continuous with said inlet opening; said mixing tube having a gradually increasing cross-sectional area in the direction of flow; said diffuser being further slightly enlarged in cross-sectional area in the transition from said mixing tube to said distributing portion; and said distributing portion thereafter having a gradually decreasing cross-sectional area in the direction of flow.

References Cited in the file of this patent

UNITED STATES PATENTS

| | | |
|---|---|---|
| 1,729,093 | Baker | Sept. 24, 1929 |
| 2,173,330 | Gregg | Sept. 19, 1939 |
| 2,890,843 | Attinello | June 16, 1959 |